Figure 1:
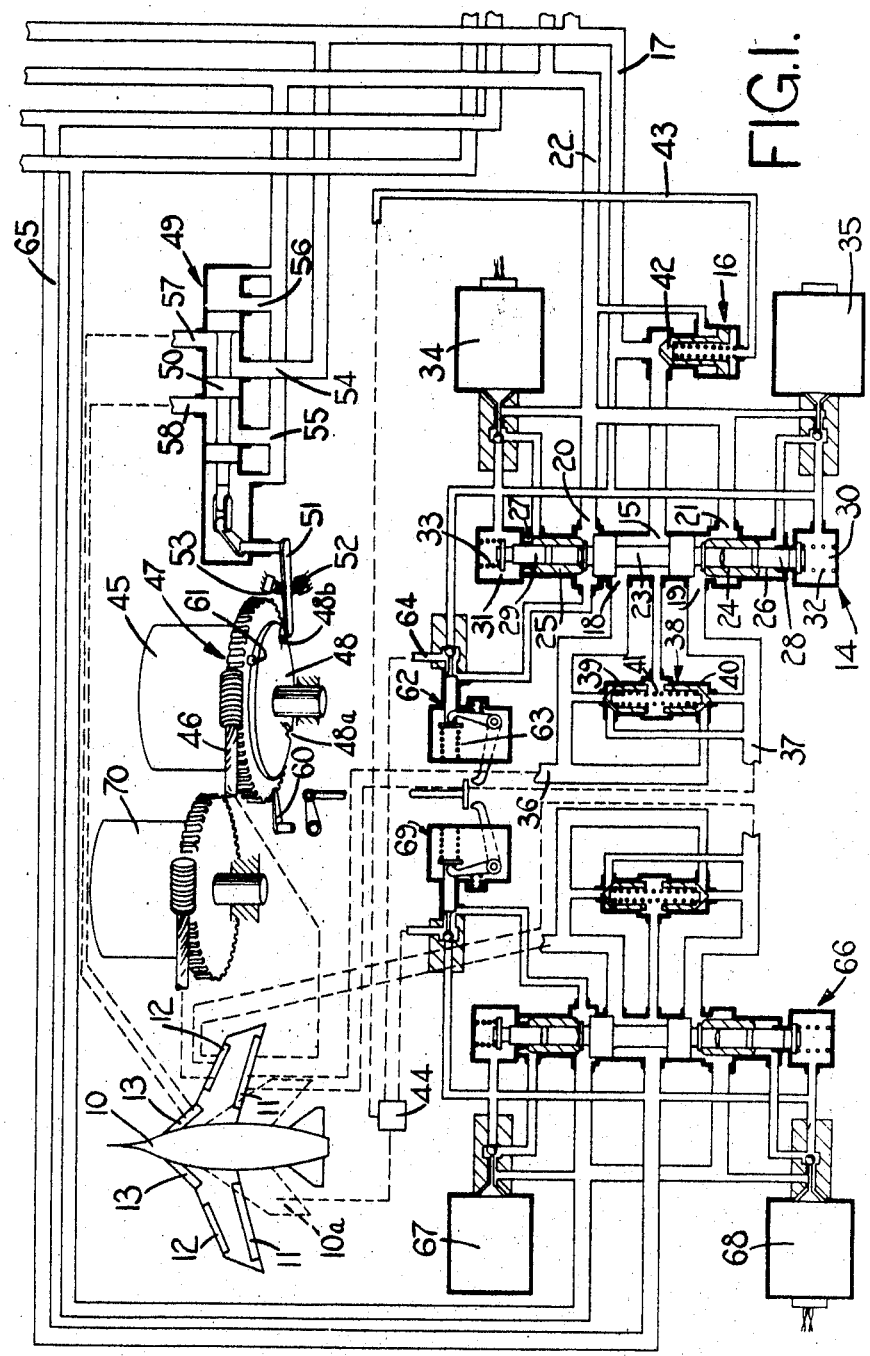

United States Patent [19]
Maltby et al.

[11] 3,794,276
[45] Feb. 26, 1974

[54] ELECTRO-HYDRAULIC ACTUATING SYSTEMS FOR AIRCRAFT CONTROL SURFACES

[75] Inventors: Peter John Maltby, Codsall; Alan Malpass, Dudley; Kenneth Harold Ellis, Shareshill, all of England

[73] Assignee: Lucas Aerospace Limited, Birmingham, England

[22] Filed: Oct. 4, 1972

[21] Appl. No.: 294,785

[30] Foreign Application Priority Data
Oct. 7, 1971 Great Britain.................. 46626/71

[52] U.S. Cl. .................. 244/78, 244/77 F, 318/565
[51] Int. Cl. ............................................ B64c 13/36
[58] Field of Search 244/78, 75 R, 76 R, 77 F, 77 M, 244/83 R, 85, 46, 48; 137/625.64; 307/149; 318/564, 565; 340/166 R

[56] References Cited
UNITED STATES PATENTS

| | | | |
|---|---|---|---|
| 2,744,698 | 5/1956 | Baynes............................ | 244/48 X |
| 3,129,645 | 4/1964 | Olmsted.................... | 137/625.64 X |
| 3,220,317 | 11/1965 | Fuell................................ | 244/78 X |
| 3,247,498 | 4/1966 | Sadvary et al. ............. | 340/166 R X |
| 3,338,139 | 8/1967 | Wood................................ | 244/78 X |
| 3,426,650 | 2/1969 | Jenney................................. | 244/78 |
| 3,454,849 | 7/1969 | Kirchhein et al............ | 244/77 M X |
| 3,462,660 | 8/1969 | Barltrop............................ | 318/564 |
| 3,603,534 | 9/1971 | Barltrop................................ | 244/78 |

Primary Examiner—Duane A. Reger
Assistant Examiner—Barry L. Kelmachter
Attorney, Agent, or Firm—Holman & Stern

[57] ABSTRACT

An electro-hydraulic actuator arrangement for control surfaces on aircraft wings comprises a hydraulic servo system responsive to first and second electrical signals to move the control surfaces in respective opposite directions, a position-respective means which provides third electrical signals to selected inputs of a pair of comparator circuits, and means for selecting required positions for the control surfaces. The position selecting means provides fourth electrical signals to other inputs of the comparator circuits, and the first and second electrical signals are provided at the outputs of the respective comparator circuits.

11 Claims, 9 Drawing Figures

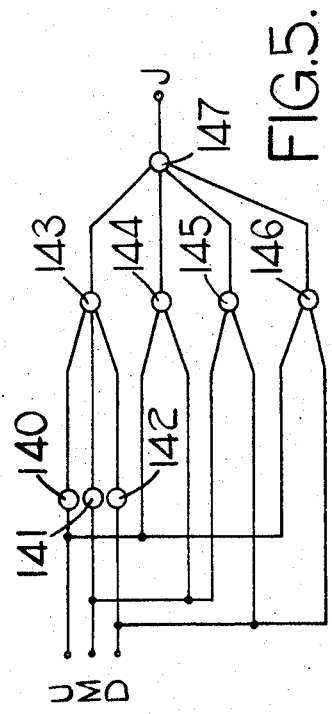
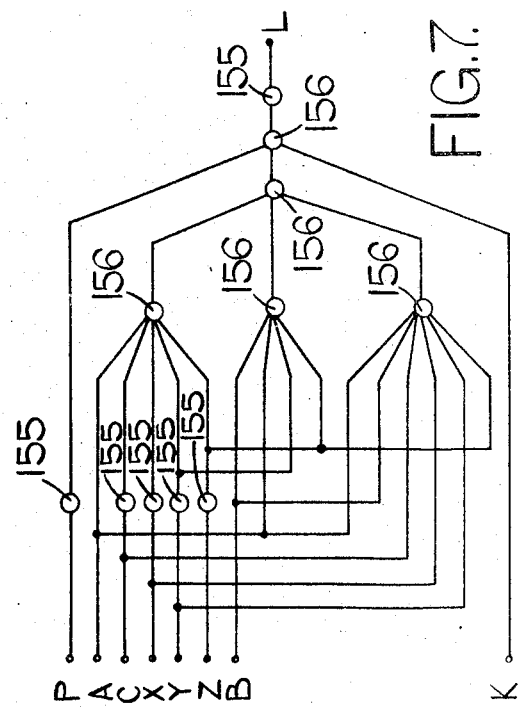

ELECTRO-HYDRAULIC ACTUATING SYSTEMS FOR AIRCRAFT CONTROL SURFACES

This invention relates to electro-hydraulic actuating systems for aircraft control surfaces.

According to the invention an electro-hydraulic actuating arrangement for control surfaces on aircraft wings comprises a servo control valve arrangement responsive to first and second electrical control signals to apply a pair of fluid operating pressures to urge a first set of control surfaces respectively towards and away from a fully retracted position, first and second electrical comparator circuits each having a plurality of input connections and an output connection, means responsive to the positions of said set of control surfaces to generate third electrical control signals on selected ones of the said input connections, selector means operable by selection of desired positions for said set of control surfaces to generate fourth electrical control signals on selected others of the said input connections, the said comparator circuits providing, in response to predetermined combinations of signals at the inputs thereof, said first and second electrical control signals at the respective output connections.

Figure 2A:
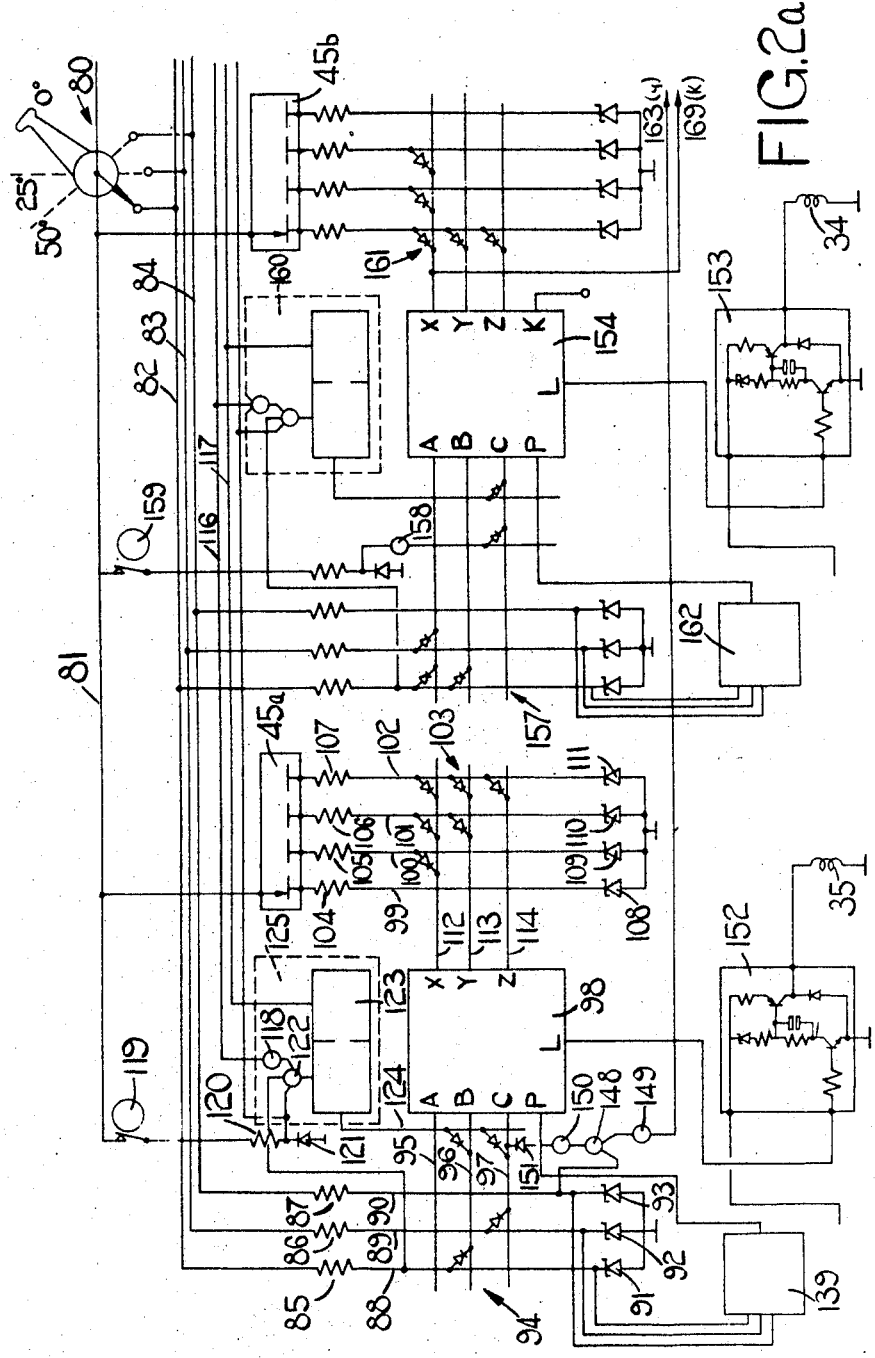
Figure 2B:
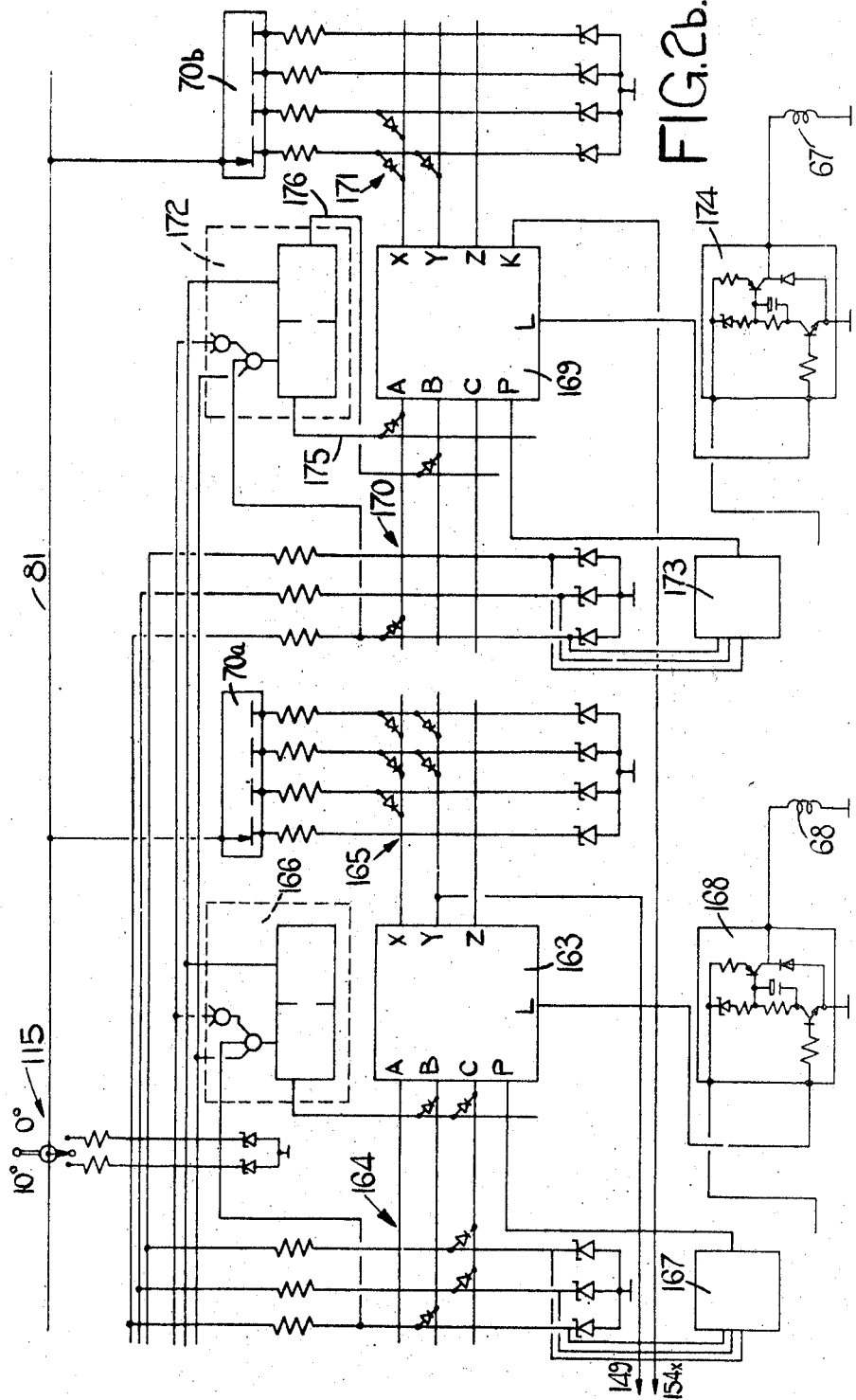
Figures 3, 4:
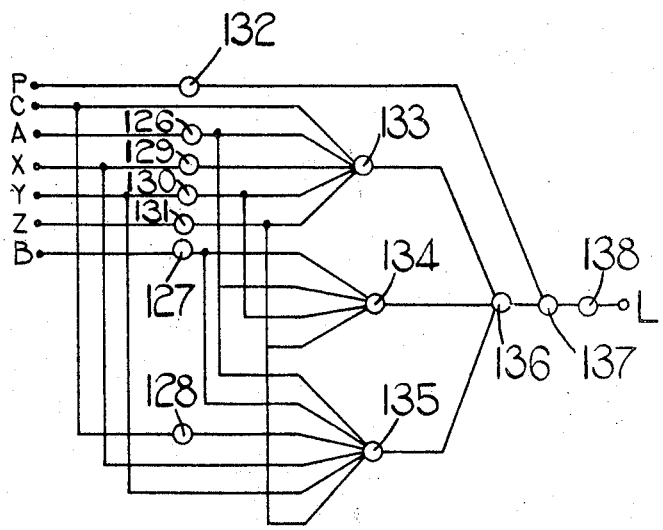

An example of the invention will now be described with reference to the accompanying drawings in which:

FIG. 1 shows a hydraulic control arrangement for control surfaces on an aircraft, FIGS. 2a and 2b should be read in conjunction and show a block diagram of an electric circuit associated with the arrangement of FIG. 1, FIGS. 3, 5, and 7 show details of logic circuits forming parts of the circuit of FIGS. 2a and 2b, and FIGS. 4, 6 and 8 are truth tables for the logic circuits of FIGS. 3, 5 and 7 respectively.

An aircraft 10 has variable geometry wings which can be swept back from the positions shown to the positions indicated at 10a. On each wing are flap arrangements 11 and slat arrangements 12. On the leading edge of each wing adjacent the root is a further flap arrangement 13. Arrangements 11, 12, 13 include screw jacks powered by hydraulic motors (not shown).

The motors for flap arrangements 11 are supplied with fluid under pressure via a spool-type selector valve 14. Valve 14 has an inlet port 15 which communicates, via a shut-off valve 16 to be later described, with a pressure supply line 17. Valve 14 also has outlet ports 18, 19 and exhaust ports 20, 21. Ports 21, 20 communicate with each other and with a low pressure return line 22. A spool 23 is slidable in valve 14 between a position in which ports 15, 18 and ports 19, 21 respectively intercommunicate and a position in which ports 15, 19 and ports 18, 20 respectively intercommunicate. Spool 23 is engageable at opposite ends thereof by plungers 24, 25 which are responsive to the pressures in chambers 26, 27 respectively. Also engageable with opposite ends of spool 23 and extending through axial bores in the respective plungers 24, 25 are piston elements 28, 29. Elements 28, 29 are subjected to the pressures in respective chambers 30, 31 and are also biased towards spool 23 by respective springs 32, 33.

A solenoid valve 34 is connected to valve 14 such that, in the energized condition of valve 34, chambers 31 and 27 communicate respectively with the pressure supply line 17 and the return line 22. In the de-energized condition of valve 34 chambers 27 and 31 both communicate with supply line 17. A further solenoid valve 35 is similarly connected to valve 14 so that, in the energized condition of valve 35, chambers 26, 30 communicate respectively with return line 22 and supply line 17, and in the de-energized condition of valve 35 chambers 26, 30 both communicate with supply line 17.

Ports 18, 19 of valve 14 communicate with the motors of flap arrangement 11 via passages 36, 37. A double relief valve 38 has a pair of closure members 39, 40 which are biased against the pressures in passages 36, 37 by a spring 41 and also by the pressure at port 15.

Valve 16 between port 15 and the pressure supply line 17 has a closure member 42 responsive to a signal pressure in a line 43. Pressure in line 43 is derived from a wing-sweep control unit 44, this pressure being present when the wings are away from their fully forward position, i.e. at more than 25° to normal to the aircraft axis, whereby the flap motors cannot then be energized.

A two-lane shaft position encoder 45 is driven, via a flexible cable 46 and a worm and wheel unit 47, by the motor of the flap arrangement 11. The encoder 45 provides on each of its lanes signals which corresponds to four discrete positions of the flaps 11, i.e. 0°, 10°, 25°, and 50°. Associated with the wheel of unit 47 is a slotted geneva cam 48. A spool valve 49 has its spool 50 movable by a lever 51 which is engageable in slots 48a, 48b of cam 48. Lever 51 is biased towards a central position by a pair of springs 52, 53. Valve 49 has an inlet port 54 communicating with supply line 17, interconnected exhaust ports 55, 56 communicating with return line 22, and outlet ports 57, 58 communication with the motors of the flap arrangements 13. When the flaps 11 extend beyond their 25° position, lever 51 enters slot 48b. Rotation of cam 48 anticlockwise, as seen in perspective in FIG. 1, urges spool 50 to the position shown to extend flaps 13. Continued anticlockwise rotation of cam 48 to a position corresponding to 50° extension of flaps 11, allows lever 51 to enter slot 48a. Subsequent retraction of flaps 11 from their 50° position rotates cam 48 clockwise, and lever 51 urges spool 50 to interconnect ports 54, 58 and ports 56, 57 retracting flaps 13.

A lever 60 is engageable by a projection 61 on the wheel of unit 47, whereby when flaps 11 are in other than their fully retracted positions, lever 60 operates a three-way valve 62 against a spring 63 to apply a pressure signal from line 17 via a passage 64 to the wing-sweep control unit 44. The pressure signal in passage 64 inhibits operation of unit 44 and thereby prevents the wings from being moved back. When flaps 11 are retracted passage 64 communicates with the return line 22.

The motors for the slat arrangements 12 are supplied with fluid under pressure from a further supply line 65 via a spool-type servo control valve 66 controlled by solenoid valves 67, 68. The hydraulic control arrangement for the slats 12, is in fact the same as that for the flaps 11, except that there is no shut-off valve, corresponding to the valve 16, for preventing operation of slats 12 when the wings are in a swept condition. The slat control arrangement includes a three-way vlave 69, also operated by the wheel 48 of the flap control arrangement for providing an inhibiting signal to the wing-sweep control unit 44. The slat control arrangement also includes a two-lane position encoder 70 identical to the encoder 45.

Energization of solenoid valve 34, valve 35 being de-energized, causes supply pressure to be applied to chambers 26, 30, 31 and chamber 27 to be vented to the return line 22. Spool 23 thus moves to the position shown, supplying pressure via passage 36 to drive the associated motors in a direction to retract the flaps 11. If valve 35 is energized and valve 34 de-energized, spool 23 moves to the opposite end of its travel to lower the flaps 11. Energization of valves 67, 68 similarly causes slats 12 to be respectively retracted and lowered. De-energization of both solenoid valves 34, 35 causes the forces due to fluid pressure to be equal at both ends of spool 24. Spool 24 is centered by springs 32, 33 isolating the flap motors and maintaining the flaps in a given position without fluid pressure. De-energization of both solenoid valves 67, 68 similarly maintains the slats in position.

FIGS. 2a and 2b show the control circuit for the solenoid valves 34, 35, 67, 68. A three-position switch 80 is connected to a voltage supply 81 and is movable to positions which correspond to a retracted position, 25° extension and 50° extension respectively of both flaps 11 and slats 12. The slats 12 are, in fact, not adapted to extend beyond 25°, this limitation being imposed in a manner later to be described. Voltage is applied to lines 82, 83 84 in the respective positions of switch 80. Lines 82, 83, 84 are connected to earth via resistors 85, 86, 87 respectively, conductors 88, 89 90 respectively and zener diodes 91, 92, 93 respectively.

Conductors 88, 89, 90 form part of a matrix 94 whose other part is provided by conductors 95, 96, 97 which are connected to inputs, designated A, B and C of a comparator circuit 98 later to be described. Diodes interconnect conductors 88, 96 and conductors 89, 97.

Voltage supply 81 is also connected to the tracks of encoder 45, one of whose tracks 45a has the discrete positions thereon respectively connected to earth via conductors 99, 100, 101, 102 which form part of a further matrix 103, and also via resistors 104, 105, 106, 107 and zener diodes 108, 109, 110, and 111 respectively. The other part of matrix 103 is provided by conductors 112, 113, 114 respectively connected to inputs X, Y and Z of comparator circuit 98. Diodes connect conductor 112 to conductors 100, 101 and 102, conductors 113 to conductors 101 and 102, and conductor 114 to conductor 102.

A further three-position switch 115 is connected to voltage supply 81 and is spring biased towards a neutral position, from which neutral position it is movable to positions which respectively corresponds to a retracted position and 10° extension of both flaps 11 and slats 12. In these positions of switch 115 a voltage is applied to lines 116 and 117 respectively. Line 116 forms the input of logic inverter 118.

A switch 119 coacts with the aircraft wings so as to be closed when the wings are less than or equal to 35° from their fully extended positions. Switch 119 connects voltage supply 81 to earth via a resistor 120 and a zener diode 121. A NAND gate 122 has its three inputs respectively connected to the output of inverter 118, conductor 88 and the junction of resistor 120 and diode 121. The output of NAND gate 122 forms one input of a bistable device 123, whose other input is provided by line 117. Bistable device 123 has an output 124 connected by diodes to conductors 96, 97 of matrix 94. Inverter 118, NAND gate 122 and bistable device 123 combine to form a switching circuit 125 such that there is a signal at output 124 only in the presence of a signal on line 117 and the absence of a signal from NAND gate 122.

Comparator circuit 98 is shown in more detail in FIG. 3, and comprises inverters 126, 127, 128, 129, 130, 131, 132, respectively connected to inputs A, B, C, X, Y, Z and further input P. Circuit 98 also comprises NAND gates 133, 134, 135, 136, 137. Gate 133 is connected to input C and the outputs of inverters 126, 129, 130, 131. Gate 134 is connected to the outputs of inverters 126, 126, 130, 131. Gate 135 is connected to the outputs of inverters 126, 127, 128, 131 and to inputs X and Y. Gate 136 is connected to the outputs of gates 133, 134, 135 and gate 137 to the outputs of gate 136 and inverter 132. An inverter 138 is connected to the output of gate 137. The output of inverter 138 forms an output connection L for circuit 98.

FIG. 4 shows a truth table for circuit 98, an output signal at L being present only for the combinations of input signals shown. It will be seen that in order to provide a signal at L there must be a no signal at input P. Input P is provided from the output terminal J of a failure detection circuit 139 which has three input terminals U, M, D respectively connected to conductors 88, 89, 90 of matrix 94.

Circuit 139 is shown in greater detail in FIG. 5 and comprises three inverters 140, 141, 142 respectively connected to terminals U, M, D, and five NAND gates 143, 144, 145, 146, 147. FIG. 6 shows a truth table for circuit 139 from which it will be seen that circuit 139 functions as a gate which provides an output signal when signals simultaneously appear at more than one of the terminals U, M, D, or at none of these terminals.

Conductor 90 of matrix 94 is connected to one input of a NAND gate 148 whose other input is connected to the output of an inverter 149. The output gate 148 is connected via an inverter 150 and a diode 151 to conductor 97 of matrix 94.

Output L of circuit 98 is connected to a switching amplifier circuit 152 which controls a voltage supply to solenoid valve 35.

Voltage supply to solenoid valve 34 is controlled by a switching amplifier circuit 153 responsive to a signal at output L of a comparator circuit 154. Circuit 154 is shown in detail in FIG. 7 and has inverters 155 and NAND gates 156 arranged as shown, whereby signals at selected ones of input termianls A, B, C, K, P, X, Y, Z provide signals at output L as shown in the truth table of FIG. 8.

Inputs A, B and C of circuit 154 are supplied via a matrix 157 which selectively interconnects inputs A, B with lines 82, 83. Input C of circuit 154 is supplied via an inverter 158 and a switch 159 from supply line 81, and also via a switching circuit 160 identical to circuit 125. Switch 159 coacts with a sweep selector in unit 44 for the aircraft wings (FIG. 1) so that switch 159 is open only when this selector is in a position corresponding to more than 25° of wing sweep. Switching circuit 160 receives the same input signals as the corresponding circuit 125.

Inputs X, Y, Z of circuit 154 are supplied via a matrix 161 from descrete positions on a second track 45b of the encoder 45. Input P of circuit 154 is supplied from a gate 162, identical to gate 139, which provides an output signal when there are signals simultaneously on more than one of the lines 82, 83, 84 or when no signals are present on these lines.

Solenoid valve 68 is controlled via a comparator circuit 163 identical to circuit 98. Circuit 163 has its inputs supplied via matrices 164, 165 respectively from lines 82, 83, 84 and from one track 70a of encoder 70. A switching circuit 166, identical with circuits 125, 160 is also connected to inputs B and C of circuit 163. An exclusive OR gate 167 whose construction and function is identical with gates 139, 162, is connected to input P of circuit 163. Input Y of circuit 163, upon which there is a signal when the slats 12 are extended to 25°, is connected to inverter 149 associated with comparator circuit 98. Signals at output L of circuit 163 control valve 68 via a switching amplifier 168, as before.

Solenoid valve 67 is controlled via an arrangement substantially identical to the arrangement associated with valve 34, comparator circuit 169 being identical with circuit 154. Matrices 170, 171 have, however, their own respective unique connections with lines 82, 93, 84 and with a track 70b of encoder 70. A switching circuit 172, an exclusive OR gate 173 and a switching amplifier 174 are provided, as before. Switching circuit 172 has one output 175, corresponding to output 124 of circuit 125, and a further output 176 upon which there is a signal in the absence of a signal on output 175.

Input K of circuit 154 has a constant signal applied thereto. Input K of circuit 169 is connected to input X of circuit 154.

Switching amplifiers 152, 153, 168, 174 have additional inputs which are supplied with 28 volts under the control of an asymmetry detection arrangement as described in our co-pending application number (HMH 540).

In use, it is convenient to consider an initial condition in which the wings are in their fully forward positions the flaps 11 and slats 12 retracted, and switches 80, 115 are respectively at their 0° and neutral positions. Switches 119 and 159 are closed in this wing position. There are thus no signals from switching circuits 125, 160, 166. There is, however, a signal on output 176 of switching circuit 172. Signals are thus applied to the comparator circuits as follows:

Circuit 98, input B;
Circuit 154, input A, B, X, Y, Z, K.
Circuit 163, input B;
Circuit 169, input A, B, X, Y, K.

There is thus no signal at any of outputs L, and the flaps and slats do not move.

Movement of switch 80 to the 25° position energizes line 83, whereupon input signals to the comparator circuits are:

Circuit 98, input C;
Circuit 154, inputs A, X, Y, Z, K.
Circuit 163, input C;
Circuit 169, inputs B, X, Y, K.

Whereupon there is a signal at outputs L of circuits 98, 163 and the flaps 11 and slats 12 extend downwards.

Changes in the output signals from encoders 45, 70 as the flaps and slats pass through 10° do not affect the logic states of the comparator circuits, flaps 11 and slats 12 thus continue to move downwards until the 25° position is reached, whereupon input signals to the comparator circuits are:

Circuit 98, inputs C, X, Y.
Circuit 154, inputs A, X, K.
Circuit 163, inputs C, X, Y.
Circuit 169, inputs B, K. resulting in no output signals from any of the comparator circuits and arresting the flaps and slats.

The signal at input Y of circuit 163 is applied via inverter 149 to one input of NAND gate 148 with slats 12 at 25° there will thus be a constant signal from NAND gate 148, and hence no signal from inverter 150.

If switch 80 is now moved to the 50° position the signals at the comparator circuit inputs become as follows:

Circuit 98, inputs X, Y;
Circuit 154, input X;
Circuit 163, inputs C, X, Y;
Circuit 169, inputs B, K;

There is an output signal from circuit 98 only to move the flaps downwards. At 50° of flap extension the signals at X, Y, Z, of circuit 98 arrest the flaps.

If, instead of the above sequence, switch 80 is moved directly from the 0° to the 50° position, the initial absence of a signal at input Y of circuit 163 combines with the signal on line 84 to remove the output signal from NAND gate 148, which via inverter 150 provides a signal at input C of circuit 98. This signal corresponds to selection of 25° flap angle, and is maintained until the slats reach 25° whereupon the signal from inverter 150 disappears and the flaps move on to 50°.

The flaps 13 are extended as the flaps 11 move onwards from the 25° position, as previously described with reference to FIG. 1.

The slats and flaps are retracted by selectively setting switch 80 to the required positions, the sequence of operations being, effectively, the reverse of that just described.

If, with slats and flaps retracted and switch 80 in its 0° position, switch 115 is set to its 10° position, the resultant signal on line 117 provides signals from switching circuits 125, 160, 166 and from output 175 of circuit 172. Comparator circuits 98, 163 thus have signals at inputs B and C and the flaps and slats extend to their 10° positions.

The switching circuits 125, 160, 166, 172 maintain the 10° signal inputs to the comparator circuits even when switch 115 is returned to its central position. Movement of switch 115 to its 0° position retracts flaps 11 and slats 12.

If, with flaps 11 and slats 12 in 10° positions as demanded by switch 115, switch 80 is set to its 25° or 50° position, the resultant zero signal on line 82 causes switching circuits 125, 160 166, 172 to change state. The 10° command is thus removed. Commands from switch 80, thus over-ride commands from switch 115.

Again, with flaps 11 and slats 12 in their 10° positions, selection of wing sweep angles of greater than 25° causes switch 159 to open. A signal thus appears at input C of comparator circuit 154. This signal, combined with the signal from matrices 157, 161 causes the flaps 11 to retract, the slats 12 being unaffected. Movement of the wings in response to a sweep selection signal is in these circumstances inhibited by valves 62, 69 as above described with reference to FIG. 1.

If, with the slats 12 extended and the flaps 11 retracted, the wings are subsequently swept to angles exceeding 35° switch 119 resets switching circuits 125, 160, 166, 170 causing the slats 12 to be retracted.

The entire electrical circuit described above is, in fact, duplicated, solenoid valves 34, 35, 67, 68 being controlled by both he circuits in parallel. The screw jack of the flap and slat arrangements 11, 12 may be powered by a pair of motors mounted in tandem, the motors being controlled by an arrangement as described.

We claim:

1. An electro-hydraulic actuating arrangement for control surfaces on an aircraft wing comprising a servo control valve arrangement responsive to first and second electrical control signals to apply a pair of fluid operating pressures to urge a first set of control surfaces respectively towards and away from a fully retracted position, first and second electrical comparator circuits each having a plurality of input connections and an output connection, means responsive to the positions of said set of control surfaces to generate third electrical control signals on selected ones of said input connections, selector means operable by selection of desired positions for said set of control surfaces to generate fourth electrical control signals on selected others of the said input connections, the said comparator circuits providing, in response to predetermined combinations of signals at the inputs thereof, said first and second electrical control signals at the respective output connections, first and second failure detection circuits respectively associated with said first and second comparator circuits and operable in the absence of said fourth electrical control signals from said multi-position switch to provide signals on one of said others of the input connections to the first and second comparator circuits respectively to cause removal of said first and second electrical signals.

2. An electro-hydraulic actuating arrangement for control surfaces on an aircraft wing comprising a servo control valve arrangement responsive to first and second electrical control signals to apply a pair of fluid operating pressures to urge a first set of control surfaces respectively towards and away from a fully retracted position, first and second electrical comparator circuits each having a plurality of input connections and an output connection, means responsive to the positions of said set of control surfaces to generate third electrical control signals on selected ones of said input connections, selector means operable by selection of desired positions for said set of control surfaces to generate fourth electrical control signals on selected others of the said input connections, the said comparator circuits providing, in response to predetermined combinations of signals at the inputs thereof, said first and second electrical control signals at the respective output connections, a second servo control valve arrangement operable to apply a pair of second fluid operating pressures to urge a second set of control surfaces respectively towards and away from a fully retracted position, said second servo valve arrangement being responsive to said position sensing means for said first set of control surfaces to cause said second set of control surfaces to be moved from their fully retracted positions automatically when said first set of control surfaces reaches a predetermined position.

3. An electro-hydraulic actuating arrangement for control surfaces on an aircraft wing comprising a servo control valve arrangement responsive to first and second electrical control signals to apply a pair of fluid operating pressures to urge a first set of control surfaces respectively towards and away from a fully retracted position, first and second electrical comparator circuits each having a plurality of input connections and an output connection, means responsive to the positions of said set of control surfaces to generate third electrical control signals on selected ones of said input connections, selector means operable by selection of desired positions for said set of control surfaces to generate fourth electrical control signals on selected others of the said input connections, the said comparator circuits providing, in response to predetermined combinations of signals at the inputs thereof, said first and second electrical control signals at the respective output connections, a third servo control valve arrangement responsive to fifth and sixth electrical signals to apply a pair of fluid operating pressures to urge a third set of control surfaces respectively towards and away from a fully retracted position, third and fourth electrical comparator circuits each having a plurality of input connections and an output connection, means responsive to the position of said third set of control surfaces to generate seventh electrical control signals on selected ones of said input connections for the third and fourth comparator circuits, signals on selected others of said input connections for the third and fourth comparator circuits being provided by said fourth electrical control signals from said selector means.

4. An actuating arrangement as claimed in claim 3 which includes a selector switch operable to provide an eighth electrical control signal to select a desired position of both said sets of control surfaces, and a detector switch operable to provide a ninth electrical signal only when the aircraft wings are at less than a predetermined angle from their most forward position.

5. An actuating arrangement as claimed in claim 4 which includes first, second, third and fourth switching circuits operable to provide input signals to said first, second, third and fourth comparator circuits respectively only in the presence of said eighth and ninth electrical signals.

6. An electro-hydraulic actuating arrangement for control surfaces on an aircraft wing comprising a servo control valve arrangement responsive to first and second electrical control signals to apply a pair of fluid operating pressures to urge a first set of control surfaces respectively towards and away from a fully retracted position, first and second electrical comparator circuits each having a plurality of input connections and an output connection, means responsive to the positions of said set of control surfaces to generate third electrical control signals on selected ones of said input connections, selector means operable by selection of desired positions for said set of control surfaces to generate fourth electrical control signals on selected others of the said input connections, the said comparator circuits providing, in response to predetermined combinations of signals at the inputs thereof, said first and second electrical control signals at the respective output connections.

7. An actuating arrangement as claimed in claim 6 in which said position-responsive means comprises a shaft position encoder, and said third electrical control signals respectively correspond to discrete positions of said set of control surfaces.

8. An actuating arrangement as claimed in claim 6 which includes first and second electrical wiring matrices respectively associated with said first and second comparator circuits, one part of each said matrix communicating with said selected ones of the comparator circuit input connections and another part of said matrix communicating with said selected others of said comparator input connections.

9. An actuating arrangement as claimed in claim 6 in which said selector means inlcudes a multi-position switch movable to select said desired positions.

10. An actuating arrangement as claimed in claim 6 in which said servo control valve arrangement includes a valve having an inlet a pair of outlet ports, a spool control element movable in opposite directions in response to said first and second electrical control signals respectively to provide said fluid operating pressures at the respective outlet ports, and biasing means operable in the absence of both of said electrical control signals to move said spool control element to a mid-position in which both said outlet ports are shut.

11. An actuating arrangement as claimed in claim 10 which includes first and second solenoid valves operable by said first and second electrical control signals respectively to apply first and second servo control pressures to opposite ends of said spool element, said biasing means being operable to move said spool element to said mid-position when said servo control pressures are substantially equal.

* * * * *